2,798,880
METALLO-ORGANIC PHOSPHORUS COMPOUNDS

Oren F. Williams and James Forrest Allen, South Charleston, W. Va., assignors to Food Machinery and Chemical Corporation, New York, N. Y., a corporation of Delaware No Drawing. Application December 29, 1953,
Serial No. 401,059

3 Claims. (Cl. 260—438)

This invention relates to novel, complex metallo-organic phosphorus compounds, and more particularly to complexes between copper dithiophosphates and disulfides formed by combination of two organic dithiophosphate molecules, and to their uses.

These complex compounds and the methods of preparing them are entirely new, since the prior art contains no reference whatsoever to them. They are useful as oil additives and, partially because of the presence of toxic heavy metals, are very effective biocides.

Based on a preponderance of the experimental evidence, these compounds appear to have the generic formula:

$$x(RO)_2P(S)SSP(S)(OR)_2 \cdot yCuSP(S)(OR)_2$$

wherein the various R radicals may be the same or different organic radicals, and $x$ and $y$ are small integers, although we do not wish to be unduly and exclusively bound to this theory of the nature and structure of our novel compositions of matter.

The literature discloses the preparation of heavy metal salts of dithiophosphoric acids, as in U. S. Patent 1,939,951; cuprous salts of the type $(RO)_2PS_2(Cu)$, as in U. S. Patent 2,552,570; and disulfides of the type $$(RO)_2P(S)SSP(S)(OR)_2$$

as in U. S. Patent 1,763,852 but there is no disclosure or teaching whatever in the literature of the novel complexes of this invention, and the novel processes for preparing them.

A preferred method for making the new products involves the reaction of a heavy metal salt, such as cupric sulfate, with salts of secondary dithiophosphate esters of the class $(RO)_2P(S)SM$ as illustrated by the following equation:

$$4(RO)_2P(S)SM + 2CuSO_4 \rightarrow$$
$$(RO)_2P(S)SSP(S)(OR)_2 \cdot 2CuSP(S)(OR)_2 + 2M_2SO_4$$

wherein R may be any organic radical and M may represent any common univalent cation, such as sodium, potassium, ammonium, triethylammonium, pyridinium, etc.

Alternatively, the dithiophosphoric acid may be reacted directly with a suitable metal compound, such as in this case cupric salt, oxide, hydroxide or carbonate, with or without the use of a liquid medium.

It will be seen from an examination of the above equation that oxidation-reduction apparently takes place, with the cupric ion being reduced to the cuprous state and half of the dithiophosphate being oxidized to the disulfide. Based on this concept, reactive cupric rather than cuprous compounds must be used in the above process. Likewise, other heavy metals should be of the type capable of oxidation-reduction reactions, such as mercury, iron, nickel, cobalt etc.

Preferred species are those wherein the organic radicals are ethyl and/or isopropyl groups, or at least a substantial proportion of the positions being occupied by at least one of these radicals. For example, the use of a mixture of about equal proportions of normal and isopropyl alcohols would yield a product containing a substantial proportion of isopropyl radicals, and this would be a preferred type of product, at least for certain uses.

The products are liquids or low melting solids ranging in color from tan to dark brown, but in the liquid state or in solution the products have an intense dark brown color indicative of coordination complexes, and it is presumably these complexes which are responsible, at least in part, for the biological activity.

The stability of the complex varies considerably with the nature of the radical R. For example, when R is methyl or ethyl the complex is decomposed by washing with methanol at ordinary temperature. Under these conditions the disulfide is dissolved by the methanol and the cuprous salt remains undissolved. But when R is isopropyl the complex dissolves entirely in methanol and crystallizes from solution with no change in composition. However, when the complex containing the isopropyl radical is dissolved in ether and cooled, the disulfide crystallizes from solution and can be further crystallized to obtain the pure compound. The crude cuprous salt may be obtained by removing the solvent from the original mother liquor and recrystallization from isopropyl alcohol gives the pure salt.

Both the disulfide and cuprous salt are pale yellow in color, but when fused together or dissolved in the same solvent the intense brown color of the original complex appears and a spectral trace covering the visible portion of the spectrum indicates that the reconstituted complex is identical with the original complex, both having maximum absorption at 4200A°.

The dithiophosphates used as intermediates in the preparation of our products are obtained by the well-known reaction of phosphorus pentasulfide and an alcohol or phenol, or mixtures of such type compounds, followed by neutralization of the resulting acid with the appropriate base. The following equations illustrate these reactions:

$$P_2S_5 + 4ROH \rightarrow 2(RO)_2P(S)SH + H_2S(RO)_2P(S)$$
$$SH + NaOH \rightarrow (RO)_2P(S)SNa + H_2O$$

The use of mixed alcohols and/or phenols yields mixed dithiophosphates, which can be used as a method of producing numerous variations of the R groups of the general formula given above. Thus, when a mixture of two different alcohols or phenols is reacted with phosphorus pentasulfide, three di-substituted hydrogen dithiophosphates may be formed which result in the formation of three cuprous salts. The three acids, however, are capable of giving rise to five disulfides, each of which is capable of combining in six different ways with the cuprous salts to form a complex containing one disulfide molecule and two molecules of cuprous salt, making a total of thirty possible compounds.

The dithiophosphate salt and the copper salt are reacted in stoichiometric ratios at about 50° C. by mixing aqueous solutions of the two salts, but temperatures from 0° C. to 80° C. may be used if desired and organic solvents such as ethanol or acetone may be employed instead of water. The order of mixing is not important and, if desired, solid copper sulfate pentahydrate may be added to an aqueous solution of the dithiophosphate, or vice versa. The reaction is essentially instantaneous and the product may form as a solid or a liquid depending upon the nature of the R groups, the temperature, and the impurities present in the reactants. Yields are almost quantitative, and for some uses no effort need be made to purify the products, since purification may not lead to a more desirable product for a use such as a fungicide. However, the products may be purified by washing and recrystallization techniques.

As indicated above, these complex compounds may also be prepared by careful fusion of the individual compounds constituting the complex, preferably in stoichiometric proportions. Also, this combination can be effected by bringing the individual compounds together in solution, using a compatible solvent, followed by careful removal of the solvent, i. e. in a manner to avoid decomposing the complex. This may involve vacuum drying or distillation, in order to avoid excessively high temperatures in solvent removal. An advantage of this method is that it may be used to provide different organic radicals in the disulfide unit as against the radicals appearing in the metallic dithiophosphate unit.

EXAMPLE 1

A solution of copper sulfate pentahydrate was prepared by dissolving 1413 g. (5.65 mole) of the pentahydrate salt in 4 liters of warm water. To this solution was added with stirring a solution of 2844 g. (11.3 mole) of commercial potassium, diisopropyl, dithiophosphate dissolved in about 2 liters of water. A dark brown, heavy liquid was obtained which was washed twice by decantation with 4-liter portions of water. Cracked ice was added to the last wash water to cool the product and after removal of the water the product solidified to a soft brown mass. The product was placed in a 4-liter filter flask and dried by reducing the pressure to 2–3 mm. The weight of product (Bis-O,O-diisopropylthiophosphoryl disulfide)-$\mu$-dicopper(I)bis-O,O - diisopropyldithiophosphate was 2742 g. or 99% of theory. After 4 recrystallizations a sample was found by analysis to contain 14.1% copper, 12.3% phosphorus, and 25.1% sulfur. Theory for $C_{24}H_{56}Cu_2O_8P_4S_8$ is: Cu, 13.0%; P, 12.6%; S, 26.2%.

EXAMPLE 2

Bis-2-ethylhexyl hydrogen dithiophosphate was prepared by adding 155.6 g. (0.7 mole) of phosphorus pentasulfide to 365 g. (2.8 mole) of 2-ethyl-1-hexanol, heating to 40–50° C. for 1 hour and then to 90–95° C. for 6 hours. The product was a dark viscous liquid weighing 487 g. (98% yield). A portion of this acid (42.6 g.) was converted to the sodium salt by stirring with water (200 ml.) and gradually adding a solution of sodium hydroxide until the pH of the solution was only slightly less than 7. To this solution was then added the theoretical amount of copper sulfate pentahydrate (15 g.) dissolved in water. A dark viscous liquid was obtained which was separated from the aqueous solution by decantation, transferred to a separatory funnel, shaken with water and then extracted with ether. The ether layer was dried with anhydrous sodium sulfate. The product, (Bis-O,O-2-ethylhexylthiophosphoryl disulfide)-$\mu$-dicopper(I) bis-O,O - 2 - ethylhexyldithiophosphate, a dark brown liquid which did not solidify upon standing, was recovered by filtration to remove the sodium sulfate and evaporation of the ether in vacuo. The yield was 46 g. or 99%.

EXAMPLE 3

Two-tenths mole of dicyclohexyl hydrogen dithiophosphate, obtained from equivalent quantities of cyclohexanol and phosphorus pentasulfide, was neutralized with 0.2 mole of sodium hydroxide in aqueous solution. To the resulting solution was added with stirring 0.1 mole of copper sulfate pentahydrate dissolved in 125 ml. of hot water. A very viscous, black liquid was precipitated at once and was separated from the water solution by decantation. Upon cooling, the product, (bis-O,O-cyclohexylthiophosphoryl disulfide)-$\mu$-dicopper(I) bis-O,O-dicyclohexyldithiophosphate, became an extremely viscous, tacky mass which was readily soluble in hot hexane. The yield was essentially quantitative.

EXAMPLE 4

By the method of Example 3, sodium bis-2-chloroethyl dithiophosphate was reacted with copper sulfate to form a solid product, (bis-2-chloroethylthiophosphoryl disulfide)-$\mu$-dicopper(I) bis-O,O-2-chloroethyldithiophosphate, having the characteristic brown color.

EXAMPLE 5

By the method of Example 3, sodium diphenyl dithiophosphate was reacted with copper sulfate to form a dark, highly viscous product which was dissolved in chloroform and dried with anhydrous sodium sulfate. Filtration to remove the sodium sulfate and evaporation of the solvent gave a viscous liquid which crystallized when stirred vigorously. The product, (bis-O,O-diphenylthiophosphoryl disulfide)-$\mu$-dicopper(I) bis-O,O-diphenyldithiophosphate, was converted to a yellow powder by grinding in a mortar. The yield was 98% of theory.

EXAMPLE 6

Tertiary butyl alcohol does not react readily with phosphorus pentasulfide, so pyridine was added to the reaction mixture to promote the reaction. A mixture consisting of 44.5 g. of phosphorus pentasulfide (0.2 mole), 59.3 g. of tertiary butyl alcohol (0.8 mole), and 31.6 g. of pyridine (0.4 mole) was heated at 50–60° C. for about 2 hours. The brown viscous liquid product, obtained in 100% yield, was dissolved in 150 ml. of water and a solution of 25 g. of copper sulfate pentahydrate (0.1 mole) dissolved in 125 ml. of water was added rapidly with stirring. A heavy, brown liquid product was obtained and this solidified after washing with cold water. The yield of product, (bis-O,O-di-t-butylthiophosphoryl disulfide)-$\mu$-dicopper(I) bis-O,O-di-t-butyldithiophosphate, was 27 g. or 50%.

EXAMPLE 7

*Preparation of product with ethyl and isopropyl radicals*

A mixture of ethanol and 2-propanol (0.4 mole each) was reacted with phosphorus pentasulfide (0.2 mole) at 40–50° C. for one hour and the mixture was then heated at 90° C. for 1.5 hours. The yield of mixed ethyl isopropyl hydrogen dithiophosphates was 74 g. or 93%. Thitry-two grams of this mixed acid (0.16 mole) was placed in 100 ml. of water, neutralized with sodium hydroxide, and filtered. To the filtrate was added a solution of 20 g. (0.08 mole) of copper sulfate pentahydrate in 125 ml. of water at room temperature. The black oil which first formed was washed with water and then treated with about 100 ml. of hexane which dissolved about half of the product and left a pale yellow solid melting at 146–148° C. After drying the hexane solution with sodium sulfate the solvent was removed in vacuo and the liquid residue combined with the solid fraction by heating on a water bath. Some loss was experienced in the mechanical operations and the weight of product was only 24.6 g. or 66.5%.

*Anal.*—Calcd. for $C_{20}H_{48}Cu_2O_8P_4S_8$: Cu, 13.7%; P, 13.4%; S, 27.8%. Found: Cu, 13.8%; P, 11.8%; S, 27.1%.

EXAMPLE 8

*Preparation of product with cyclohexyl and isopropyl radicals*

Using the method of Example 7, a similar product was obtained from cyclohexanol, 2-propanol, phosphorus pentasulfide, sodium hydroxide and copper sulfate pentahydrate. The product obtained in 90% yield, was a very dark, tacky resin which was completely soluble in hot hexane.

*Anal.*—Calcd. for $C_{36}H_{72}Cu_2O_8P_4S_8$: Cu, 11.2%; P, 10.9%; S, 22.5%. Found: Cu, 9.9%; P, 7.1%; S, 22.4%.

EXAMPLE 9

A mixture consisting of 3.33 g. (0.012 mole) of cuprous diisopropyl dithiophosphate and 2.22 g. (0.006 mole) of bisdiethylthionophosphoryl disulfide $(C_2H_5O)_2P(S)S—S(S)P(OC_2H_5)_2$ was melted on a hot water bath to form a very dark brown liquid product, (bis-O,O-diethylthiophosphoryl disulfide)-$\mu$-dicopper(I) bis - O,O - disopropyldithiophosphate, which did not solidify upon cooling.

EXAMPLE 10

A mixture consisting of 2.18 g. (0.0051 mole) of bis-O,O-diisopropylthiophosphoryl disulfide and 2.82 g. (0.0102 mole) of cuprous diisopropyl dithiophosphate was heated briefly on a boiling water bath until a dark brown liquid product was obtained. Upon cooling to ordinary temperature the product, (bis-O,O-diisopropylthiophosphoryl disulfide)-$\mu$-dicopper(I) bis-O,O-diisopropyldithiophosphate, solidified and was ground to a greenish yellow powder.

EXAMPLE 11

A solution prepared by dissolving 0.0031 mole (1.32 g.) of bis-O,O-diisopropylthiophosphoryl disulfide in 50 ml. of cyclohexane was added rapidly to 0.0062 mole (1.72 g.) of cuprous diisopropyl dithiophosphate dissolved in 50 ml. of the same solvent. The brown color which developed immediately continued to deepen and the solution became opaque after a few seconds. Evaporation of the solvent in vacuo gave a product identical with the product described in Example 10.

EXAMPLE 12

One-tenth mole (25.2 g.) of potassium diisopropyl dithiophosphate was dissolved in approximately 100 ml. of isopropyl alcohol by warming to 50 or 60° C. With vigorous stirring this solution was added rapidly to a solution of 0.05 mole (9.08 g.) of anhydrous cupric acetate dissolved in approximately 100 ml. of isopropyl alcohol at about 50° C. The resulting solution became dark brown immediately but stirring was continued at 50–60° C. for about 15 minutes. The solution was then cooled and filtered to remove by-product potassium acetate and the isopropyl alcohol was evaporated in vacuo. Since the product contained some potassium acetate, it was extracted with hexane and filtered to remove the undissolved salt and the solvent then removed at reduced pressure. The weight of dull yellow product, identical with that of Example 10, was 24 g. or 98% of theory.

EXAMPLE 13

Cupric hydroxide was prepared by adding a solution of 6.4 g. of sodium hydroxide (0.16 mole) dissolved in 75 ml. of cold water to 20 g. of cupric sulfate pentahydrate (0.08 mole) dissolved in 200 ml. of cold water. To the well-stirred suspension of cupric hydroxide was added 34.3 g. of diisopropyl hydrogen dithiophosphate (0.16 mole). The product, (bis-O,O-diisopropylthiophosphoryl disulfide) - $\mu$ - dicopper(I) bis - O,O - diisopropyldithiophosphate, precipitated as a deep brown liquid but soon solidified to a soft brown mass. The yield was approximately 100%.

In testing the fungicidal properties of some of these products, they were formulated as wettable powders containing 15% active ingredient and suspended in water to give desired concentration. In tests on the control of early and of late tomato blight (P. infestans) bean rust and pea seed treatment, the isopropyl compounds gave substantial control of fungus infestation.

These compounds may be formulated as either dusting compositions or, as indicated above, as wettable powders for application in liquid spray form. The liquid selected should be of such nature as not to cause decomposition of the coordination complexes, since the biological activity of these compounds appears to be based largely upon the existence of such complexes, and perhaps upon their degree of stability.

From a consideration of the foregoing disclosures, it will be obvious to those skilled in the art that other embodiments of the invention may be devised, but it is intended that all such variations fall within the scope of the appended claims.

That which is claimed as new is:

1. Compounds of the formula $(RO)_2P(S)SSP(S)(OR)_2 \cdot 2CuSP(S)(OR)_2$ wherein R is an organic radical selected from the group consisting of aliphatic radicals containing from one to eight carbon atoms.

2. A compound as set forth in claim 1, wherein R is ethyl.

3. A compound as set forth in claim 1, wherein R is isopropyl.

References Cited in the file of this patent

UNITED STATES PATENTS

| | | |
|---|---|---|
| 1,939,951 | Buchanan | Dec. 19, 1933 |
| 2,373,811 | Cook | Aug. 17, 1945 |
| 2,552,570 | McNab | May 15, 1951 |